Aug. 11, 1964  A. R. CLANTON ETAL  3,143,780
MACHINE FOR MOLDING CONCRETE BLOCKS
Filed Dec. 5, 1960  5 Sheets-Sheet 5

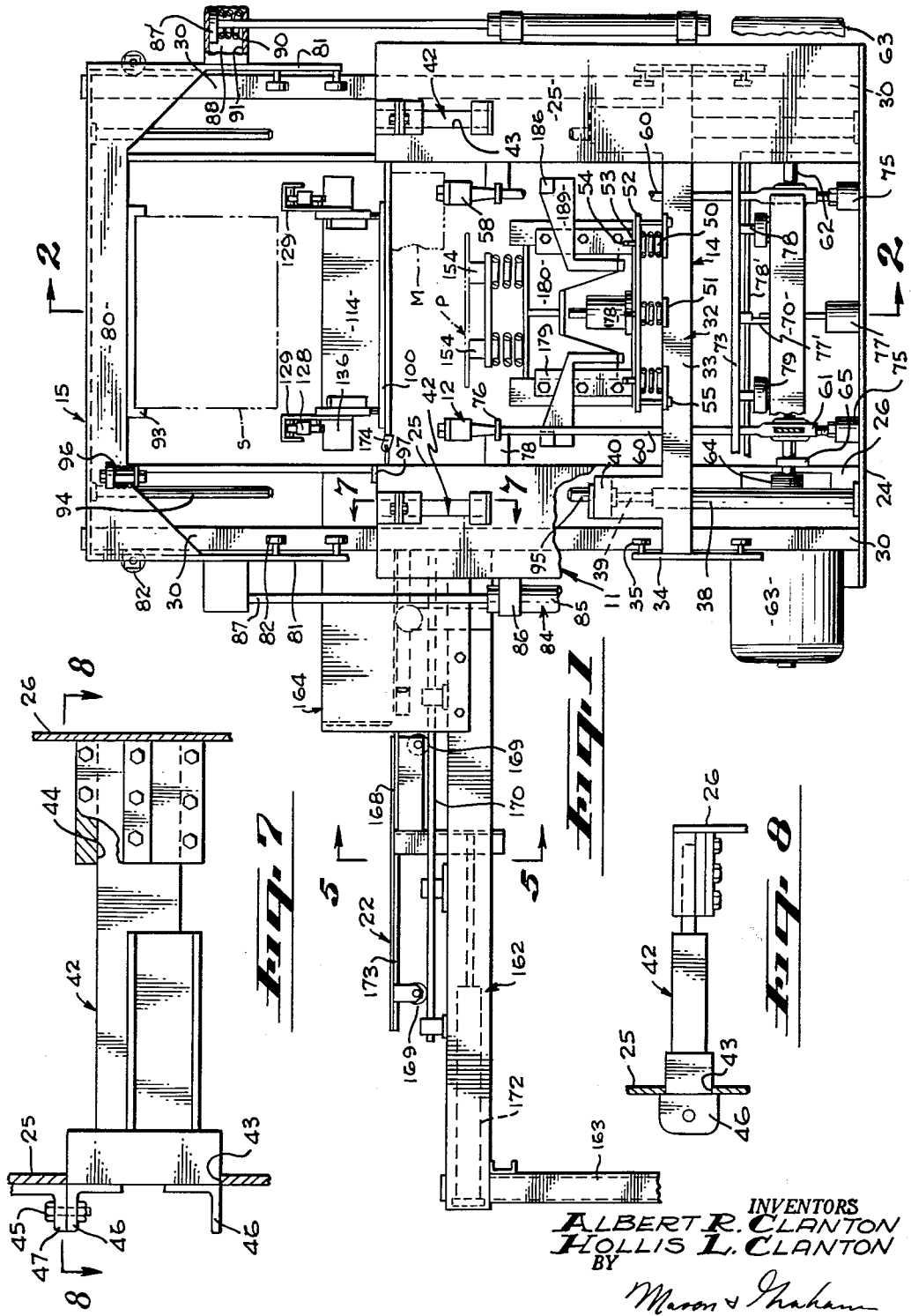

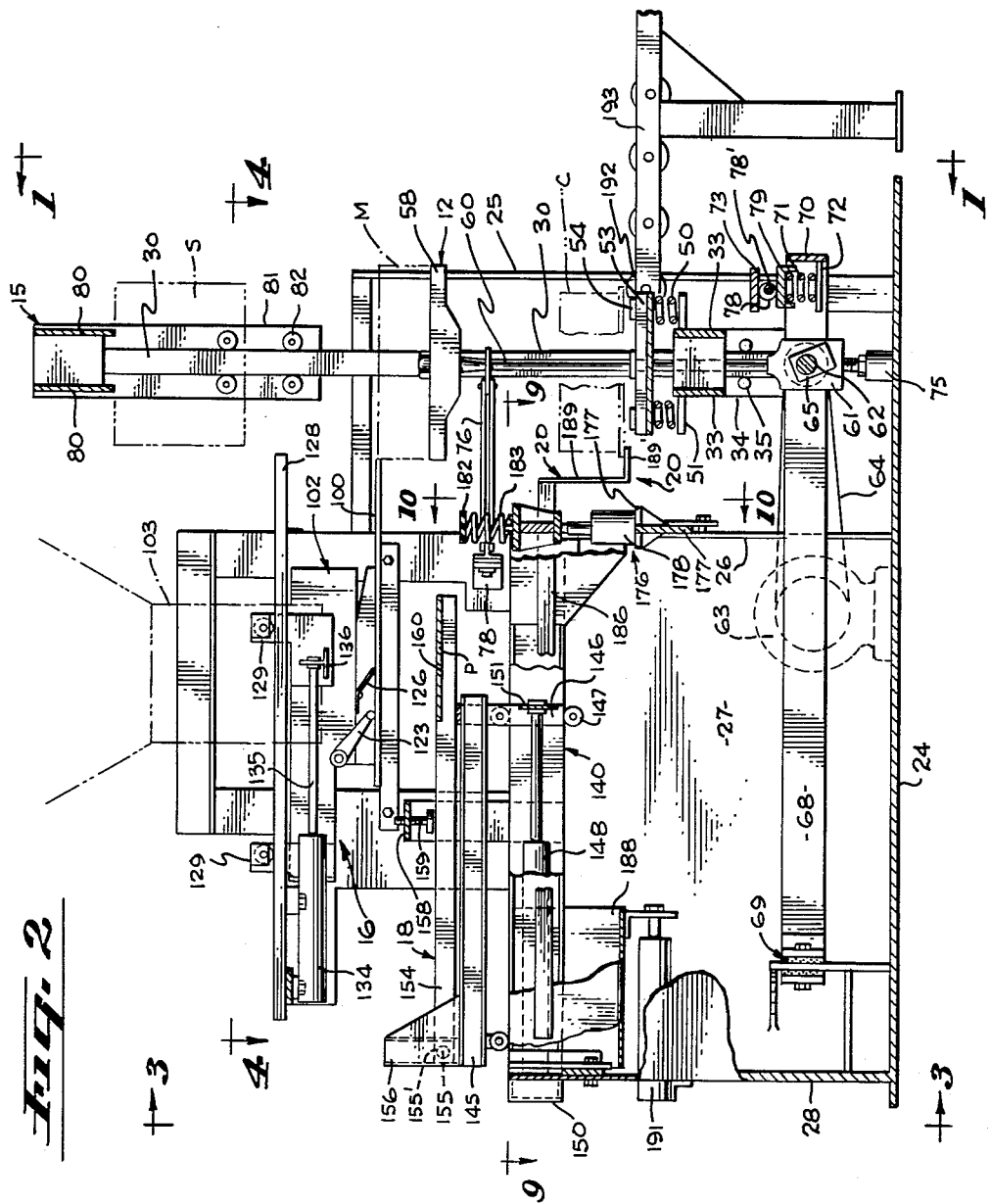

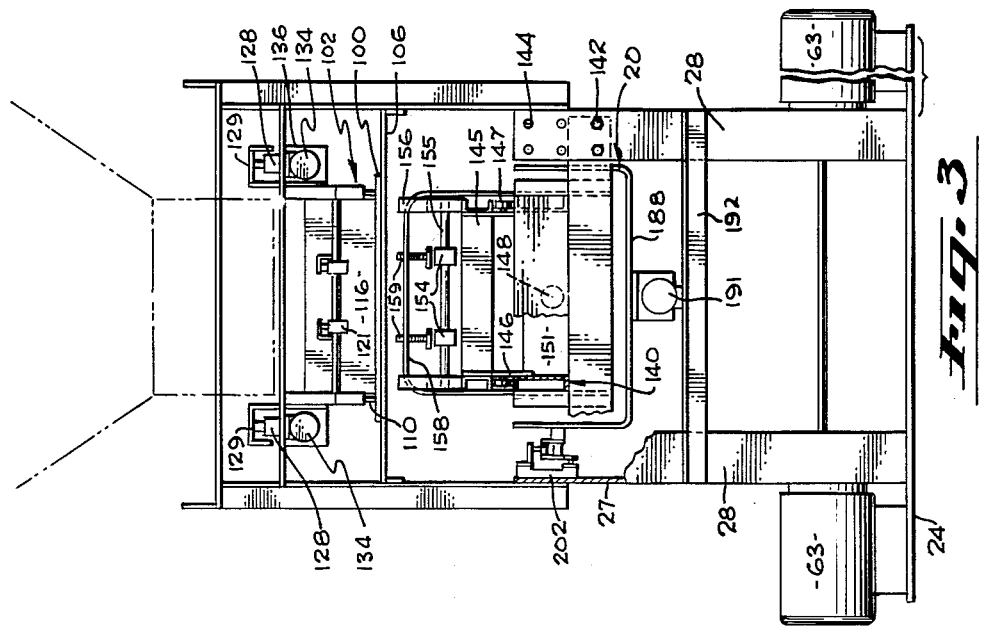
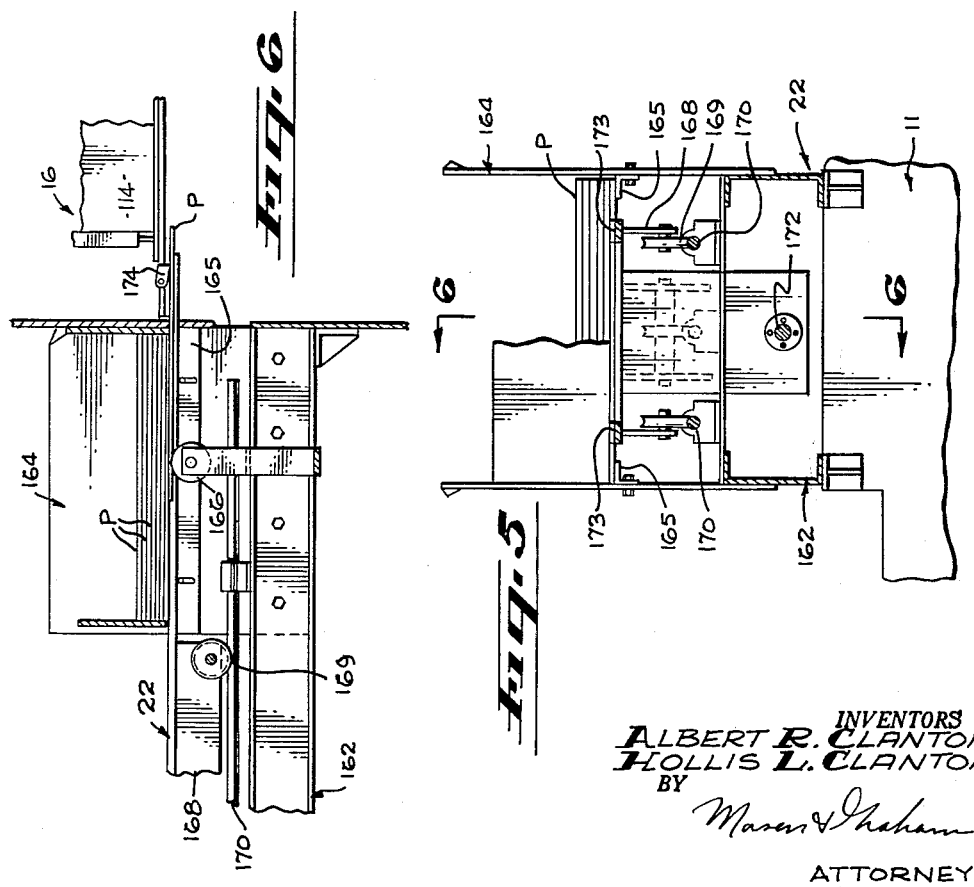

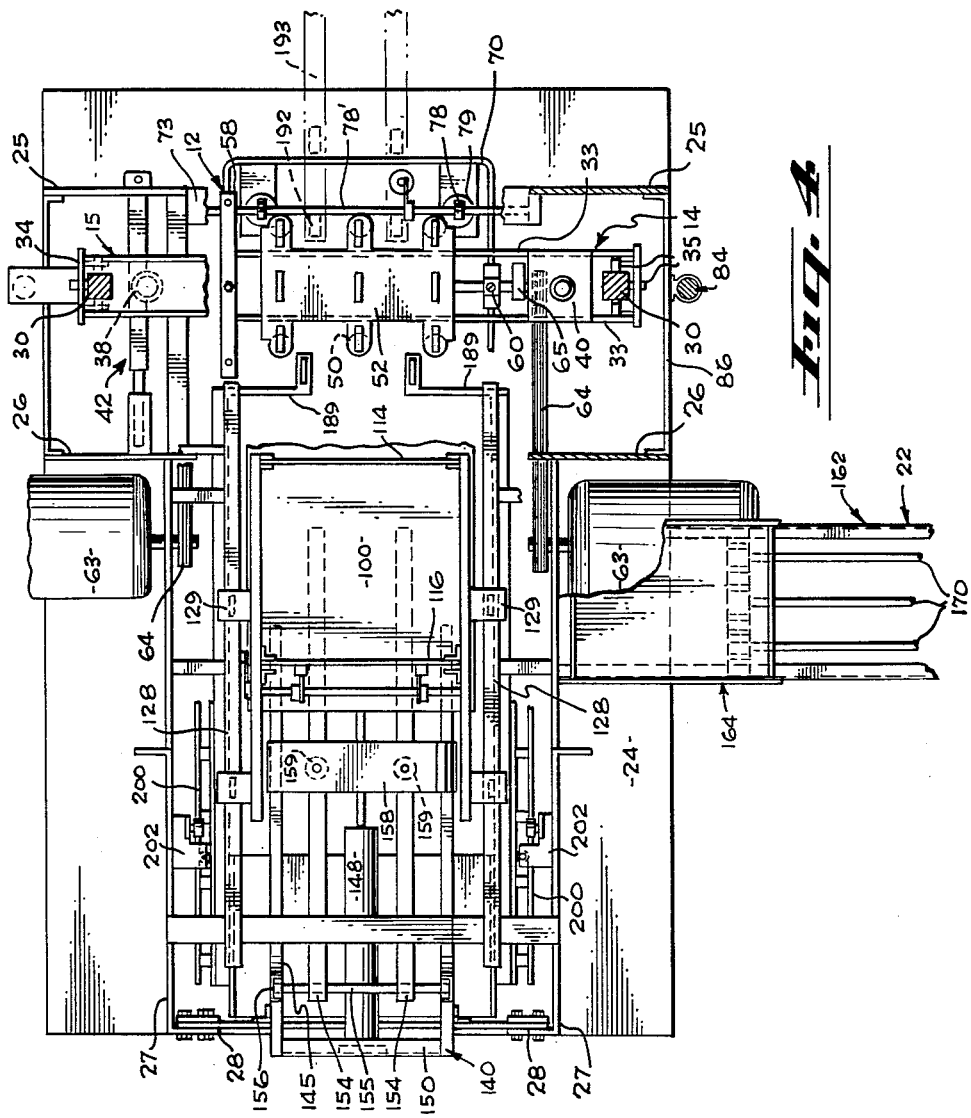

INVENTORS
ALBERT R. CLANTON
HOLLIS L. CLANTON
BY
Mason & Graham
ATTORNEYS

United States Patent Office 3,143,780
Patented Aug. 11, 1964

3,143,780
MACHINE FOR MOLDING CONCRETE BLOCKS
Albert R. Clanton, 9260 Dorrington Place, Pacoima, Calif., and Hollis L. Clanton, 8527 Remick, Sun Valley, Calif., assignors of one-third to Raymond W. Clanton, Sun Valley, Calif.
Filed Dec. 5, 1960, Ser. No. 73,903
8 Claims. (Cl. 25—41)

This invention has to do with machines for molding concrete blocks such as are used in the construction of buildings and walls.

An object of the invention is to provide a novel machine for molding concrete blocks having a new and improved rapid cycle of operation. In this connection it is an object to provide a novel method and novel apparatus for enabling the immediate positioning of a new pallet beneath the mold as soon as the cast blocks have been removed from the mold, rather than delaying the positioning of the new pallet until the pallet-supporting table returns from delivering the previous or old pallet and its load of cast blocks, such as in conventional machines. Further in this connection it is an object to provide a novel mechanism for transporting a new pallet into place beneath the mold where it acts as the bottom wall of the mold, and to provide novel means for holding the new pallet in place temporarily until the pallet-supporting table returns to hold the pallet. It may be pointed out that as the cast blocks are ejected from the mold they, and the pallet which had hitherto formed the bottom wall of the mold, move downwardly with the pallet-supporting table upon which the pallet rests. By immediately placing a new pallet in position, the cycle of operation of the machine is considerably shortened since it enables the mold to be filled sooner. Also, the placement of a new pallet immediately after the cast blocks are ejected prevents the loss of much material which temporarily clings to the mold structure but which is jarred loose before a new pallet can be placed in position by conventional means. Thus there is a considerable saving in both time and material.

Still another object is to provide a block-molding machine having novel means for handling the green cast blocks after they have been ejected from the mold which makes it possible to begin vibrating the mold before the blocks have been moved completely off of the machine itself.

Other objects will be apparent from the drawings and the following description. Referring to the drawings:

FIG. 1 is a front elevational view, partially broken away, on line 1—1 of FIG. 2, showing a machine embodying the invention;

FIG. 2 is a sectional elevational view on line 2—2 of FIG. 1;

FIG. 3 is a rear elevational view, partly broken away, on line 3—3 of FIG. 2;

FIG. 4 is a sectional plan view on line 4—4 of FIG. 2;

FIG. 5 is an enlarged sectional view on line 5—5 of FIG. 1;

FIG. 6 is a fragmentary sectional view on line 6—6 of FIG. 5;

Figures 9, 11:
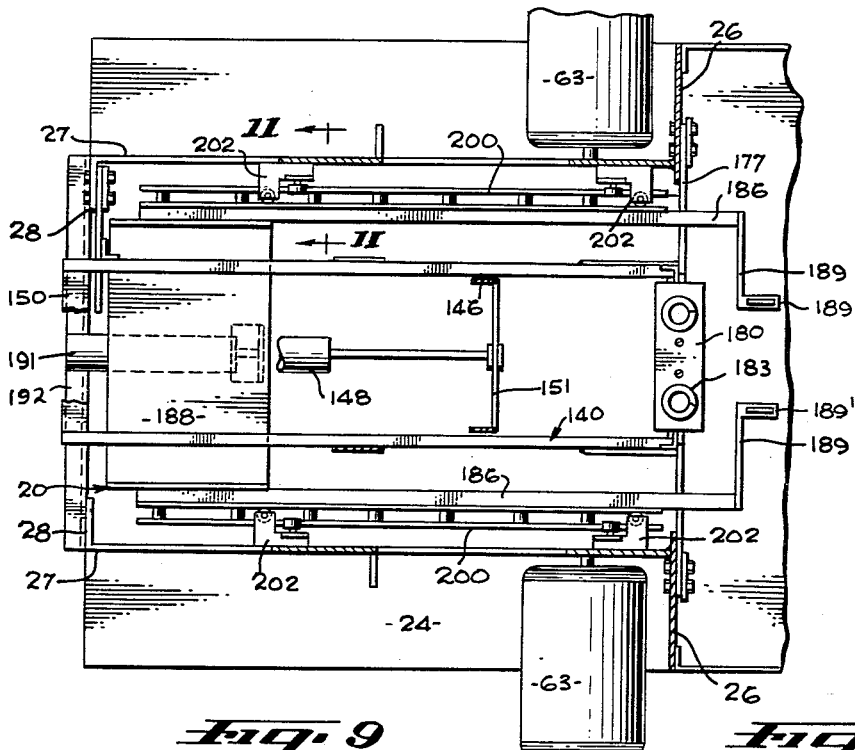
Figures 10, 12:
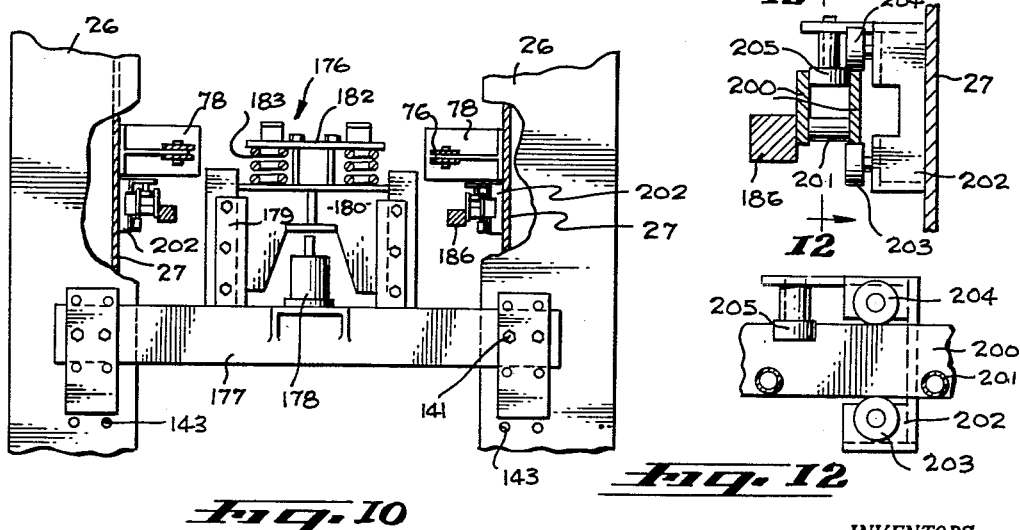

FIG' 7 is an enlarged fragmentary sectional view on line 7—7 of FIG. 1;

FIG. 8 is a sectional plan view on line 8—8 of FIG. 7, but on a smaller scale;

FIG. 9 is a fragmentary sectional plan view on line 9—9 of FIG. 2;

FIG. 10 is a fragmentary sectional elevation on line 10—10 of FIG. 4;

FIG. 11 is an enlarged fragmentary sectional view on line 11—11 of FIG. 9; and

FIG. 12 is a fragmentary sectional view on line 12—12 of FIG. 11.

More particularly describing the invention, in general the machine includes a frame 11, a mold-support assembly 12 a table assembly 14, a head assembly 15, a material feed assembly 16, an internal pallet feed assembly 18, and an ejector assembly 20. The machine also includes an external pallet feed assembly 22.

The machine is built upon a base plate 24 of the frame and at the front thereof is a pair of laterally spaced upright front plates 25. Spaced rearwardly of plates 25 is a second pair of plates designated 26. Side plates 27 extend rearwardly of plates 26 and terminate at upright rear plates 28. The various parts of the frame are preferably welded together, except where adjustment may be necessary, as will hereinafter be apparent.

Between the plates 25 and 26 there is provided a pair of stationary upright guide posts 30, shown as square in cross section, upon which the table assembly 14 and the head assembly 15 are mounted for vertical movement independently of each other.

The table assembly 14 includes a beam 32 comprised of side plates 33 connected by vertically elongated end plates 34 carrying guide rollers 35 for engaging the front, rear, and outer sides of the two guide posts 30. The beam is supported for vertical movement on the posts by means of a pair of piston-cylinder units 38 mounted upon the base and having upwardly projecting piston rods 39 secured to cross plates 40 forming part of the beam. Upward travel of the beam is limited by a pair of removable stops 42 vertically above plates 40 which are supported between the front plates 25 and plates 26, each stop extending through a slot 43 in the front plate and being received in a socket 44 on the forward side of plate 26. A bolt 45 extending through adjacent angle brackets 46 and 47 on the stop and plate serves to secure the parts. It will be apparent that the stops can be inverted for a different effective height stop. Also the stops are readily removable, so that interchangeable stops can be substituted to suit the height of a particular mold. Adjustment of the table stops 42 also serves to adjust the height stops for the head assembly since these latter stops are carried on the table beam, as will later appear.

The table itself is resiliently supported above the beam 32 upon a plurality of coil springs 50 which are mounted upon laterally extending shelves 51. The table includes a frame 52 having three ribs 53, each of which has a resilient cushion 54 upon its upper surface. The table frame is held down against springs 50 by bolts 55. As will later appear, the individual pallets P which form the bottom wall or floor of the mold are supported upon the table during a large portion of the cycle of operation.

The mold M is mounted above the upper limit of travel of the table upon the mold-support assembly 12, being detachably secured to and extending between a pair of mold supports 58. Since it is necessary that the mold be vibrated as it is being filled with concrete and for a limited period of time thereafter, the mold assembly is mounted to accomplish this in the following manner.

The mold supports 58 are mounted upon upright rods 60 which are fixedly mounted in bearing blocks 61. A vibrator shaft 62 is journaled in the blocks, being driven by motors 63 through the medium of intermediate belting 64. An eccentrically disposed weight 65 on the shaft causes it to vibrate when rotated. Each bearing block 61 is mounted at the forward end of an arm 68 which is attached to the frame by a cushioned mounting 69 which permits very limited pivotal movement in a vertical plane. A U-shaped frame 70 is preferably, although not necessarily, fixed to the bearing blocks 61 and projects forwardly thereof, being resiliently supported against upward movement by springs 71 mounted between shelves 72 on frame 70 and a rigid spring-supporting crossbar 73 of the frame. Bolts 74 extend through the parts. Vertically adjustable pedestals 75 are positioned under the bearing blocks to support the assembly. Also, a leaf spring assembly 76 stabilizes each rod 60, being connected between the rod and a bracket 78 on the frame 11.

Although it is not essential, we prefer to provide means for varying the damping effect of springs 71 and the amplitude of vibration of the mold. This can be accomplished by providing cams 78 between cups 79 at the upper ends of the springs and crossbar 73. The cams are fixed to a shaft 78' which can be operated at any desired time in any suitable manner, either by hand, or by powered means, such as the fluid ram 77 shown connected to a radial arm 77' on the shaft.

Referring now to the head assembly 15, this comprises a head which includes a pair of laterally spaced plates 80 connected at their ends by vertically elongated and depending end plates 81 carrying rollers 82 for engaging three sides of the guide posts 30. The head member is mounted upon a pair of piston-cylinder units 84, the cylinders 85 of which are secured to brackets 86 of the frame extending between front plates 25 and plates 26. Each piston rod 87 of units 84 has an enlargement 87' within a pocket 88 of the head. A compression coil spring 90 is interposed between the enlargement 87' and the bottom wall 91 of pocket 88. The head is thus floatingly mounted with the advantages of this construction as known in the art.

A stripper S appropriate to the particular mold being used is detachably mounted by any suitable means at the center of the head in frame 93.

The head carries a pair of depending height stops 94 which are in direct vertical alignment with height stops 95 carried on the table beam 32. These sets of stops limit movement of the head assembly relative to the table beam. The head also carries resilient head stops 96 which are positioned to abut pads 97 extending between plates 25 and 26 and thereby provide an absolute limit on downward movement of the head.

Referring now to the feed assembly, this comprises a stationary floor 100 supported on frame 11 which extends rearwardly from the top of the mold and a feed drawer 102 which is adapted to be reciprocated on the floor each time that the mold is to be filled. The drawer receives material from a hopper 103 indicated in broken lines and any suitable means may be provided for controlling passage of material from the hopper.

The feed drawer is suspended for movement along parallel overhead rails 128 which are attached to the frame. Four brackets 129 extend upwardly from the side walls of the feed drawer and are provided with rollers (not shown) which bear against the upper, lower, and inner surfaces of the rails, respectively. The feed drawer is moved by a pair of piston-cylinder assemblies each of which includes a cylinder 134 attached to the frame at each side of the drawer and a piston rod 135 which projects from a piston within the cylinder and is secured to a bracket 136 at the side of the drawer.

A particular feature of the invention is the means and manner of positioning a new pallet beneath the mold to form the bottom wall thereof substantially as soon as the cast blocks have been ejected from the mold and further to provide means for holding the new pallet in place beneath the mold until such time as the table returns to its upward position and can perform this function. The means for accomplishing this includes a subframe 140 extending from the rear plates 28 of the frame to the upright plates 26 just behind the area of the mold. This frame is bolted or otherwise adjustably secured to the plates 26 and 28 so that its height can be adjusted for different mold heights, the bolts being designated 141 and 142, respectively. In this connection it will be noted that the plates are provided with a series of vertically spaced holes 143, 144, respectively, through which the bolts may be selectively placed. A carriage 145 having depending legs 146 fitted with rollers 147 is mounted for movement upon the subframe 140 and is actuated by means of a piston-cylinder unit 148. The cylinder is secured to the rear cross member 150 while the piston rod is secured to the carriage upon a depending element 151 thereof.

The carriage 145 supports a pair of pallet feed tines 154 which are fixed at their rearward ends to a crossbar 155 the ends of which project laterally beyond the tines and are provided with enlargements 155' which are freely received in vertical channels 156 provided at the rear of the carriage. A bridging cross member 158 on frame 140 is provided with a pair of set screws 159 to limit upward movement of the two pallet feed tines in this region. These set screws are adjusted so that the tines will be level when they are extended and raised to hold a pallet against the under side of the mold, by means to be described. The forward surfaces of the tines are recessed at 160 to receive a pallet to be fed.

The pallets are fed to the pallet feed tines from the exterior pallet feed assembly 22 which extends normal to the direction of movement of the pallet feed tines. This latter assembly includes an exterior frame 162 which is supported upon posts 163 at its outer end and upon frame 11 of the machine at its inner end. Mounted upon the frame is a hopper 164 carrying a supply of pallets P which are supported upon angles 165 and a roller 166. A feed carriage 168, having wheels 169 which ride upon parallel bars 170 mounted upon frame 162, is powered by a piston-cylinder unit 172 mounted between frame 162 and the carriage. The latter is provided with a pair of feed arms 173 which, when the carriage moves forward, engage the lowest pallet in the hopper and move it forward until it is positioned directly over the feed tines 154 of the main pallet feed assembly. Upon retraction of the carriage the pallet is held against following the carriage by a pivoted catch 174 and thus falls upon the tines 154.

In the operation, as the pallet feed tines move forward carrying a pallet they extend sufficiently far to position the pallet beneath the mold. At this time an auxiliary pallet-holding means 176 comes into play. This means is mounted upon the main frame between the intermediate upright plates 26 thereof. The assembly includes a stationary frame member 177 upon which is mounted a piston-cylinder unit 178 and guide elements 179 in which a plate 180 is mounted for vertical movement. A platform 182 is resiliently mounted on the plate 180 with springs 183 between the parts. When the tines are extended the platform 182 is raised by the piston-cylinder unit to in turn raise the tines and hold the pallet thereon tightly against the mold. This movement actually raises the entire mold assembly a small amount (normally somewhat less than one inch), since it picks up the mold-supporting assembly against the springs 71 thereof, raising the assembly off the pedestals.

The machine also includes the block ejector assembly 20 for removing the cast blocks and pallet on which they rest from the table when the latter is lowered. The ejector comprises a pair of arms 186 having downwardly and inwardly offset forward portions 189 with forwardly projecting fingers 189'. The arms are mounted on and project forwardly of a pan structure 188 which is powered by a piston-cylinder unit 191 mounted upon a rear cross member 192 of the main frame. Runner rails 200 spaced in parallel relation by spacers 201 are supported for forward and backward movement upon brackets 202 having guide rollers 203, 204 and 205.

As best seen in FIG. 2, when the ejector assembly is retracted the fingers 189 project forwardly sufficiently that when the table is lowered a pallet thereon with its load of cast blocks C will come to rest on these fingers and on a pair of rollers 192 provided as part of the take-away roller support or conveyor system 193.

In the operation of the device, assuming that both the head and table assemblies are in down position, the interior pallet feed means 18 moves forward to place a pallet beneath the mold. The auxiliary pallet holding means 176 then raises the tines 154 and holds them and the pallet so that the pallet tightly engages the mold. The head raises simultaneously with the operation of the pallet holding means. The feed drawer 102 moves forward to carry a charge of cement mix which is deposited in the mold, and the drawer retracts. During this operation the head assembly 15 is in upper position as shown. After the feed drawer retracts the table assembly moves up and, when the table reaches the upper limit of its travel, it engages the pallet and holds the same in place. The auxiliary pallet holding means 176 moves down or retracts and the internal pallet feed assembly then returns to its position of FIG. 2. After the table assembly rises, the head assembly comes down and the stripper S engages the concrete to level the top of the material and determine the height of the blocks, the head assembly being limited in its downward movement by the coming together of height stops 94 and 95. Vibration of the mold may take place during filling and subsequent thereto for a desired period of time such as necessary to compact the mix in the mold. If desired, the amplitude of the vibration can be varied by adjusting the springs 70 in the manner previously described. When the molding operation has been completed, the head and table assemblies move down together, the cast blocks being forced out of the mold by the stripper. Movement of head assembly is limited by head stops 96 abutting pads 97 on the frame of the machine. The table continues down to the position of FIG. 2. Just before the table reaches its lowest position the pallet thereon, with its load of cast blocks, comes to rest upon the fingers 189' of ejector assembly 20 and upon rollers 192 of the take-away conveyor or table 193. The ejector then moves forward to push the pallet and its load onto the conveyor or table 193. Substantially as soon as the ejected blocks have cleared the mold the internal pallet feed assembly, which has received a new pallet from the exterior pallet feed assembly, moves forward to position a new pallet in place beneath the mold and thereby enable the immediate filling of the mold and the commencement of a new cycle.

It is contemplated that the various fluid-operated components of the machine, as well as the vibrator drive motors, be coordinated in an over-all automatic electro-hydraulic supply and control system but, since such a system is within the skill of those in the hydraulic and electric fields, no detailed disclosure of such a system need be made herein. In essence, a source of pressure fluid, preferably hydraulic, is required for the various cylinders with connections to each end of the cylinder and valve means controlling the fluid, or, if desired, spring-return type piston-cylinder units can be used. Also, a source of electric energy is required for the motor and for any solenoid valves which may be employed. Obviously, limit switches may be employed in the control system.

Although we have illustrated and described a preferred form of our invention, we contemplate that various changes and modifications can be made therein without departing from the invention, the scope of which is indicated by the following claims.

We claim:

1. In a machine for molding concrete blocks, a frame, a mold mounted on the frame, said mold being open at the top and at the bottom, a pallet-supporting table beneath the mold mounted for movement toward and away from the mold, a normally retracted forwardly projecting tine structure mounted on said frame rearwardly of said mold and adapted to hold a pallet, means for moving said tine structure forward to position a pallet below the mold in spaced relation thereto, and vertically movable tine structure-raising means engageable with said tine structure, when extended, to raise the same and position a pallet thereon in firm engagement with the underside of the mold, said tine structure and said table freely interfitting in the forward position of said tine structure and upper position of said table whereby to enable said table to engage and support a pallet held against the mold by the tine structure and permit the subsequent withdrawal of said tine structure.

2. The machine set forth in claim 1 in which said tine structure includes a carriage mounted for movement toward and away from the mold and tine means carried on the carriage projecting forwardly thereof and movable vertically a limited amount relative thereto.

3. The machine set forth in claim 2 in which said carriage is mounted upon a subframe and in which said subframe is vertically adjustable on said frame.

4. In a machine for molding concrete blocks, a frame, a mold mounted on the frame, said mold being open at the top and at the bottom, a pallet-supporting table beneath the mold mounted for movement toward and away from the mold, a carriage mounted on said frame rearwardly of said mold for movement toward and away from the mold, a tine structure carried on said carriage and including tines projecting forwardly of the carriage, vertically movable tine-raising means engageable with said tines, when extended, to raise the same and position a pallet thereon in firm engagement with the underside of the mold, said tine structure and said table being freely interfitting in the forward position of said tine structure and upper position of said table whereby to enable said table to engage and support a pallet held against the mold by the tine structure.

5. The machine set forth in claim 4 in which said tine structure is mounted for movement vertically of said carriage and in which means is provided on said frame for adjustably limiting such movement at a region spaced rearwardly of the mold.

6. In a machine for molding concrete blocks, a main frame, a mold mounted on said frame, said mold being open at the bottom, a pallet-supporting table beneath the mold, means for raising and lowering said table toward and away from said mold, a subframe mounted on said main frame for vertical adjustment relative thereto, an auxiliary pallet support means movably mounted on said subframe normally disposed rearwardly of the mold and movable forwardly for positioning a pallet beneath the mold in spaced relation therebelow, means for moving said auxiliary support means, and means mounted on said main frame and operable in timed relation with the movement of said table for raising said auxiliary pallet support means, when forwardly extended, to position and hold a pallet thereon in engagement with the bottom of the mold.

7. In a machine for molding concrete blocks, a frame structure, a mold mounted on the frame structure, a pallet-supporting table beneath the mold mounted for movement toward and away from the mold, means for raising and lowering said table, a carriage mounted on said frame structure rearwardly of the mold for movement horizontally generally toward and away from the mold, a forwardly projecting horizontal tine structure carried by said carriage and adapted to hold a pallet on its forward end surfaces, said tine structure being vertically movable relative to said carriage, vertically raisable tine structure-raising means engageable with said tine structure rearwardly of the mold when said structure is extended, to raise the same and position a pallet thereon in firm engagement with the underside of the mold, and vertically adjustable tine structure-leveling means above said tine structure in region rearwardly of said tine structure-raising means.

8. The structure set forth in claim 7 in which said carriage is carried upon a subframe, in which said subframe is vertically adjustable on said main frame, and in which said tine structure-leveling means is carried on said subframe.

References Cited in the file of this patent

UNITED STATES PATENTS

| | | |
|---|---|---|
| 1,921,003 | Romie | Aug. 8, 1933 |
| 2,467,203 | Gelbman | Apr. 12, 1949 |
| 2,492,297 | Lagarde | Dec. 27, 1949 |
| 2,524,359 | Romie | Oct. 3, 1950 |
| 2,529,066 | Annas | Nov. 7, 1950 |
| 2,589,594 | Asbell | Mar. 18, 1952 |
| 2,839,810 | Kovach | June 24, 1958 |
| 2,842,827 | Nichelson | July 15, 1958 |
| 2,870,512 | Branham | Jan. 27, 1959 |
| 2,996,782 | Kovach et al. | Aug. 22, 1961 |